US006636503B1

United States Patent
Shiran et al.

(10) Patent No.: US 6,636,503 B1
(45) Date of Patent: Oct. 21, 2003

(54) METHOD AND SYSTEM FOR COMMUNICATING WITH A TELECOMMUNICATIONS SWITCH

(75) Inventors: Mortaza Ghassab Shiran, San Jose, CA (US); Akbar Riahi, Belmont, CA (US)

(73) Assignee: Siemens Information & Communication Networks, Inc., Boca Raton, FL (US)

(*) Notice: Subject to any disclaimer, the term of this patent is extended or adjusted under 35 U.S.C. 154(b) by 0 days.

(21) Appl. No.: 09/167,398

(22) Filed: Oct. 6, 1998

(51) Int. Cl.[7] .............................................. H04L 12/64
(52) U.S. Cl. ...................................................... 370/352
(58) Field of Search ................................. 370/352–356

(56) References Cited

U.S. PATENT DOCUMENTS

| 5,596,579 A | 1/1997 | Yasrebi ........................ 395/678 |
| 5,649,005 A | 7/1997 | Lynch et al. ................. 379/242 |
| 5,742,762 A | 4/1998 | Scholl et al. ............. 395/200.3 |
| 5,915,008 A * | 6/1999 | Dulman ...................... 370/352 |

* cited by examiner

*Primary Examiner*—Melvin Marcelo

(57) ABSTRACT

A system (10) and method for accessing software applications residing on a telecommunications switch (12) is provided. The system (10) includes a communication server (14) that acts as a gateway between the switch (12) and remote clients (22, 26, 32). The client-server architecture of the system (10) permits concurrent connectivity and off-loads much of the processing demand from the switch (12) to the server (14) and/or clients (22, 26, 32). In addition, the communication server (14) can include a HTTP server (52) that allows a remote client to access switch applications using a conventional web browser.

20 Claims, 5 Drawing Sheets

METHOD AND SYSTEM FOR COMMUNICATING WITH A TELECOMMUNICATIONS SWITCH

BACKGROUND OF THE INVENTION

1. Field of the Invention

The present invention generally relates to networked communications, and in particular, to an improved method and system for accessing software applications of a telecommunications switch.

2. Description of the Related Art

Telecommunications (telecom) switches are signal transfer point devices that provide switching and call setup services in a telephone network. Various types of telecom switches include computerized branch exchanges (CBXs) and private branch exchanges (PBXs). Modern telecom switches typically include resources such as software applications and data bases for configuring the services provided by the switch.

To configure a switch, the software and database resources of the switch must be accessed. Two techniques are conventionally used for accessing switch resources. First, a computer console can be provided at the switch which provides a user interface to the software and database resources. This technique has several drawbacks; specifically, it requires the user to be physically located at the switch, it does not permit concurrent application sessions, and it consumes the processing resources of the switch itself. The second technique for accessing switch resources involves providing a network interface to the switch. The network interface permits a user to access switch resources from a remote location using a networked computer, or the like. Although this technique permits the user to remotely access the switch resources, it does not permit concurrent application sessions. Moreover, remotely executing the applications also consumes the switch's processing resources.

In addition to the above limitations, known techniques of accessing switch resources rely on a command-line user interfaces. Such interfaces generally lack user-friendliness.

In sum, there is a need for a user-friendly interface to telecom switch resources, such as configuration software and databases, that permits remote, concurrent application sessions with a reduced demand on the processing resources of the switch.

SUMMARY OF THE INVENTION

It is an advantage of the present invention to provide an improved method and system of accessing telecom switch resources that overcomes many of the drawbacks and limitations of known techniques. It is a further advantage of the present invention to provide a method and system that permits remotely located users to concurrently access switch resources using the Internet.

According to one embodiment of the invention, the system includes a communication server for managing connectivity between software applications residing on the telecom switch and network applications residing on remote clients. The communication server acts as a gateway, permitting a client-server architecture that allows concurrent connectivity. In addition, the communication server can include a web server and conventional LAN (Local Area Network) interface, which permits remote users to access the switch using a commercially available web browser, such as the Netscape Navigator from Netscape, Inc. or the Internet Explorer from Microsoft, Inc.

BRIEF DESCRIPTION OF THE DRAWINGS

The invention is pointed out with particularity in the appended claims. However, other features of the invention will become more apparent, and the invention will be best understood by referring to the following specification and accompanying drawings, in which:

DETAILED DESCRIPTION OF THE INVENTION

Figure 1:
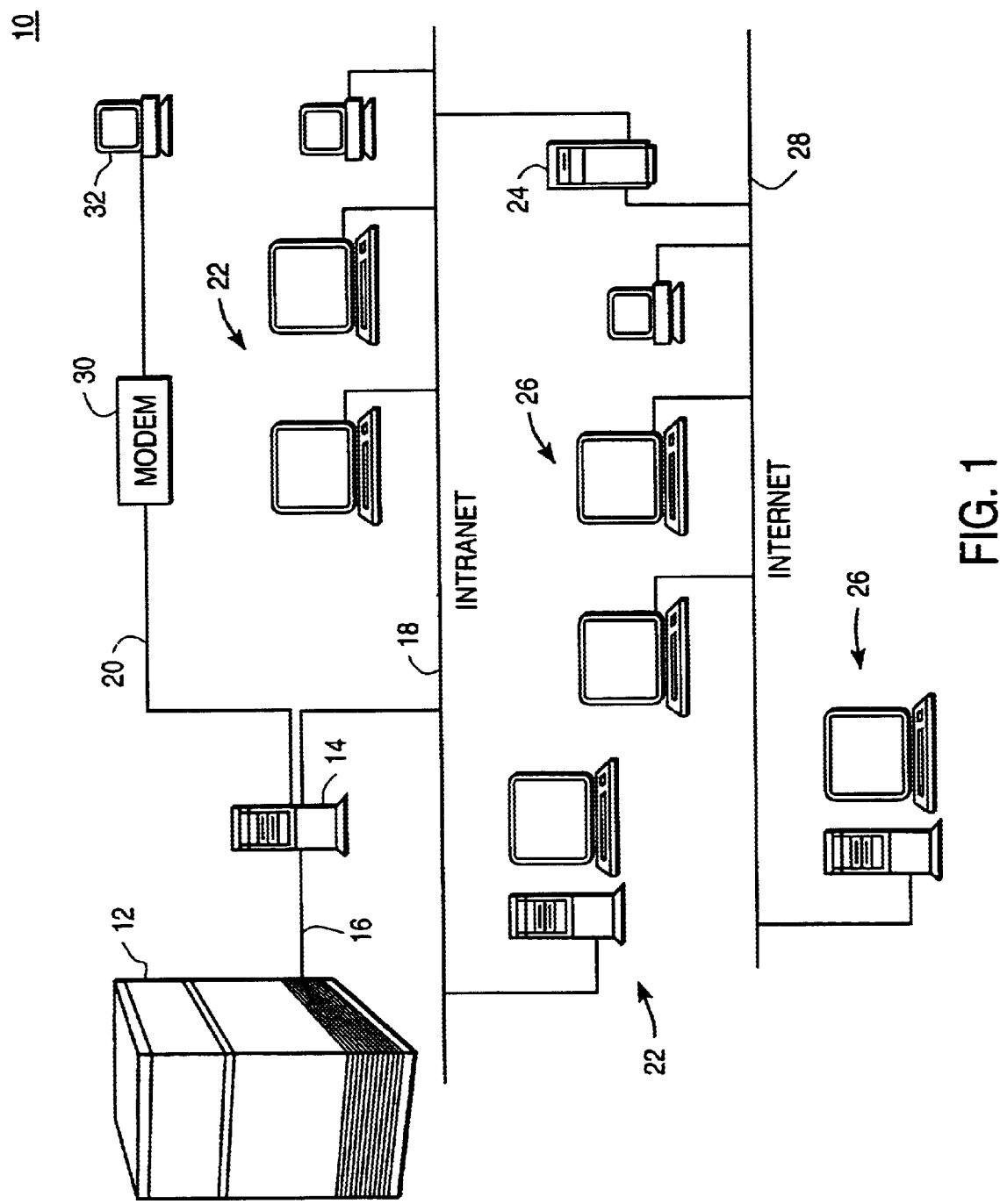
FIG. 1 is a block diagram illustrating a system in accordance with one embodiment of the present invention.

Turning now to the drawings, and in particular to FIG. 1, there is illustrated a system 10 in accordance with an embodiment of the present invention. The system 10 permits a user to remotely access software applications residing on a telecommunications switch 12. The switch applications support client-server operation between the switch and network clients. The system includes a communications server 14 coupled to the switch 12 using a local area network (LAN) 16. The communication server 14 provides a single point of entry to various software applications included in the switch 12.

In the example shown, the communications server 14 is coupled to a customer LAN that includes an Intranet 18 that communicates through a firewall computer 24 to the Internet 28. In addition, the communications server 14 can be coupled to a remote workstation 32 using any conventional communications network, such as ISDN, xDSL, or as shown, a standard modem 30 communicating via a telephone line 20. Connected to the intranet 18 is a plurality of in-house computers 22. A plurality of external computer sites 26 can communicate with devices connected to the Intranet 18 via the Internet 28 through the firewall 24. This arrangement permits a remote client to access the switch 12 from almost anywhere on the globe.

The communications server 14 acts as a gateway that permits client-server communication between the computers 22, 26, 32 and switch applications. This permits multiple users to access the switch applications from remote locations without unduly burdening the processor resources of the switch 12. The communications server 14 can be implemented using a conventional personal computer (PC) or computer workstation running a commercially available operating system (OS), such as Windows™ NT from Microsoft, Inc. or UNIX developed by AT&T, Inc. The function of the communications server 14 can be provided by a novel software program executing in conjunction with the OS.

Each of the computers 22–26, 32 can be any conventional computer that supports networked communications using TCP/IP. Each computer 22–26, 32 can also include a conventional web browser capable of running JAVA applets.

The firewall computer 24 prevents unauthorized access to the resources connected to the Intranet 18. Suitable firewall computers are commercially-available and used throughout the networking industry.

The telecom switch 12 can be a configurable device for providing switching services on a telephone network, such as a PBX, CBX, or the like. The switch 12 can be a Hicom family PBX manufactured by Siemens Corp. The switch 12 and the communications server 14 communicate using the LAN 16. The LAN 16 can be an Atlantic-LAN, which is provided with a Hicom PBX.

Figure 2:
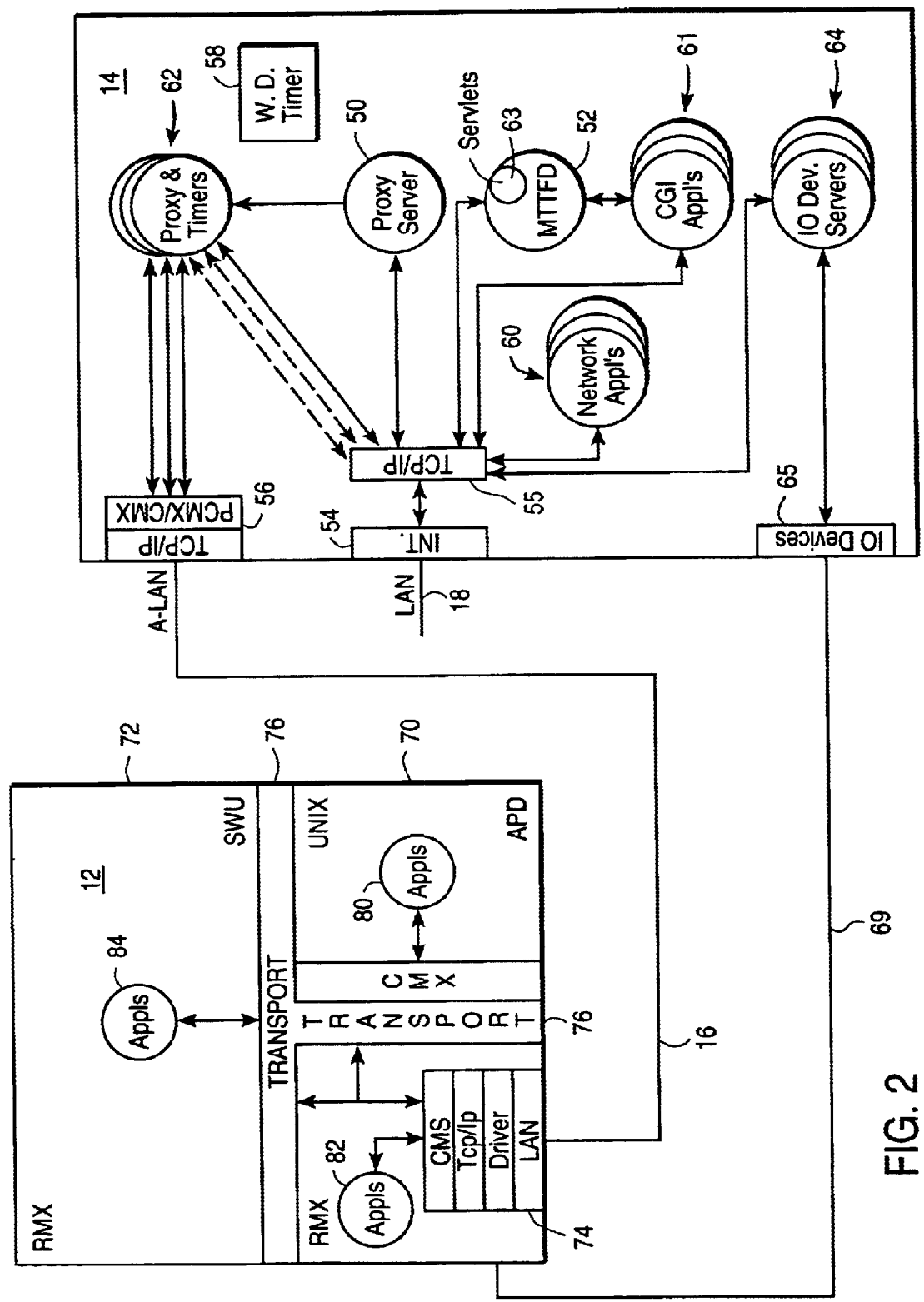
FIG. 2 is a detailed block diagram of the communication server and telecom switch shown in FIG. 1.

FIG. 2 shows a detailed block diagram of the communications server 14 and the switch 12. The communications server 14 includes a proxy server 50 and an HTTP server 52, also called a web server. The communications server 14 also includes a first conventional network interface 54 for communicating with the customer LAN 18, a second network interface 54 for communicating with the switch 12, a TCP/IP protocol stack 55, common gateway interface (CGI) applications 61, and a serial I/O interface 67. A watchdog timer 58 is provided to detect a hangup condition.

The proxy server 50 manages connectivity between software applications residing on the switch 12 and corresponding client applications residing on the remote computers 22–26, 32 communicating over the customer LAN 18. The proxy server 50 can maintain concurrent connectivity by establishing separate session threads 62 for each of a plurality of application sessions. In addition, the proxy server 50 provides single-point entry to the switch applications, and provides related functions, such as presentation of a user interface, authentication of user log-ons, and monitoring of connectivity status.

The proxy server 50 is a novel software program that can be invoked by a conventional HTTP server 52. The HTTP server 52 provides a web page for easy user access to the switch applications. The HTTP server 52 can be a commercially available software program, such as the HTTP server provided with the Windows NT™ operating system. Using the Windows™ NT, the proxy server 50 can be invoked by the HTTP server using JAVA servlets 63 or common gateway interface (CGI) software applications 61.

The HTTP server 52 can run JAVA servlets 63 to permit JAVA-based web browsers on the remote computers 22, 26 to easily access the switch applications and services. JAVA applets can be transferred to the clients by the HTTP server 52. These applets allow remote users to enter data and request services provided by the switch 12. For instance, the user interface can be implemented using JAVA applets. Using applets has advantages in that it permits platform independence.

The serial I/O interface 67 includes standard I/O devices 65 and I/O server software 64 for providing an alternative communication path to the switch 12 via a serial line 69. The serial I/O interface can use a conventional z-modem, V.24 protocol, or the like to achieve communication between the server 14 and the switch 12.

The TCP/IP stack 55 is conventional TCP/IP software that permits the various elements of the server 14 to communicate with one another, as well as permitting the customer LAN 18 to communication with the server elements and the switch LAN 18.

Using the communications server 14, a remote client can access server applications on the switch 12 in either of three ways. First, a remote client can request a switch service using the serial I/O interface 67. Under this approach, the remote client executes a client application which requests the I/O server 64 to setup an application session. The request can be transferred over the LAN 18 using a TCP/IP protocol.

Upon successfully establishing a session, communication between the server 14 and the switch 12 take place over the serial line 69.

The second manner in which a client-server session can be established is to use a web browser on one of the remote clients. Using this approach, the remote user submits a connection request to the HTTP server 52, which in response, transfers an applet back to the client. The applet can be specific to a particular switch service and can request user information, such as login identification or service parameters. Upon receiving client information entered in response to the applet, the HTTP server 52 runs a corresponding servlet 63 to invoke the proxy server 50 via the TCP/IP stack 55. The proxy server 50 then attempts to establish an application session thread 62 between the switch server application and the remote client, as will be discussed below.

As an alternative to using applets and servlets, the CGI applications 61 can be used to invoke the proxy server 50. An HTML request submitted to the HTTP server 52 by the remote client can start a CGI application, which, in turn, requests the proxy server 50 to establish an application session. Upon successfully establishing a session, communication between the remote client and switch server passes through the TCP/IP stack 55, the CGI application 61, and the HTTP server 52.

The third method for establishing a client-server session involves using conventional network communication protocols, such as the file transfer protocol (FTP) or telenet. Using FTP or telenet, a remote client can submit a session request directly to the proxy server 50 via the TCP/IP stack 55.

One or more resident client applications 60 can be included on the server 14. The applications 60 can be the same as those residing on the remote clients 22–24, 32. However, the resident applications 60 are executed by the server 14 itself. Communication between the resident client applications 60 and the switch server applications can be established using the same methods as described earlier for remote clients.

The watchdog timer 58 can be a commercially available watchdog card such as the PC Watchdog, Part No. 1090-1, manufactured by Berkshire Products of Suwance, Ga. Typically, in a PC environment, the watchdog card interfaces to an ISA bus and includes software drivers to interface to OS and applications software. In the event of a system hang-up, i.e., a permanent lack of communication between either the customer LAN 18 or the switch 12, the watchdog timer 58 generates a signal indicating a hang-up condition. The proxy server 50 can respond to the hang-up condition by issuing an alarm to alert an operator of the problem and can likewise reset the communications server 14. If left undetected, the hang-up condition could cause the telecommunications switch 12 to fail, consequently disabling phone service to a large number of users.

The switch 12 shown in FIG. 2 is exemplary and illustrates components found in commercially-available telecom switches, such as the Hicom 80EX manufactured by Siemens Corp.

The telecom switch 12 includes an additional data processor (ADP) 70 and a switching unit (SWU) 72. The SWU 72 executes one or more applications 84 under the RMX operating system, which is a real-time OS provided with a Hicom 80EX switch; while the ADP can execute one or more applications 80, 82 under either the UNIX or RMX operating system respectively. The software applications on the ADP 70 and SWU 72 support client-server execution and can include a local configuration tool (LCT), a lightweight directory access protocol (LDAP), an enhanced error analysis (EEA) program, and a trunk diagnostic server (TDS). Each of these applications can be accessed from a remote client via the communications server 14.

The ADP 70 can be implemented using a conventional data processor, such as a DM4L card available from Siemens Corp.; while the SWU 72 can be implemented using a conventional switching unit, such as the DP4L card, also available from Siemens Corp. The SWU 72 includes a matrix switch and provides switching and call setup services to the telephone network. The ADP 70 is a file server that provides file management services and maintains all I/O interfaces. The file management services include database management services for the local switch.

A network interface 74 is included in the ADP 70. The network interface 74 includes a conventional LAN circuit provided with Hicom switches. Included with the network interface 74 are software drivers for interfacing the LAN card to the RMX operating system of the ADP 70. The network interface 74 also includes a software component providing a TCP/IP protocol, and software providing an OSI transport layer interface (CMS) to the RMX operating system and RMX applications in the ADP 70. The CMS protocol also interfaces to the transport layer 76, which provides communication with the RMX OS and applications 84 in the SWU 72 and the CMX transport interface in the ADP 70. The CMX interface communicates with the UNIX OS and applications 80 in the ADP 70.

Figure 3:
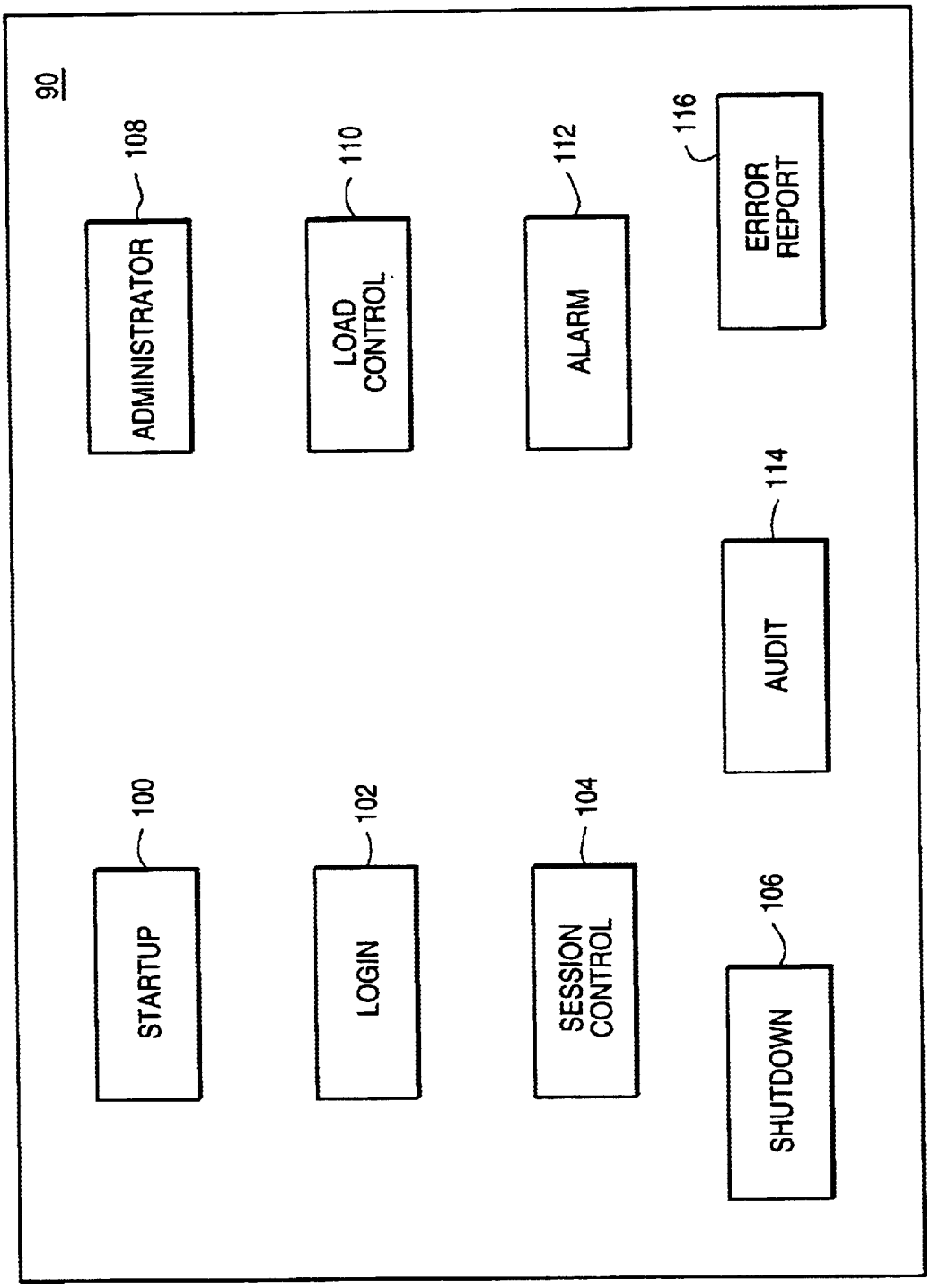
FIG. 3 illustrates software components that can be included in the proxy server shown in FIG. 2.

FIG. 3 illustrates a software complex 90 that can be included in the proxy server 50. The software complex 90 includes various software components, such as a startup component 100, a login component 102, a session controller 104, a shut-down routine 106, an administrator component 108, a load control mechanism 110, an alarm generation routine 112, an audit component 114, and an error-reporting routine 116.

The startup component 100 is a software routine that executes upon first starting the proxy server 50. The startup component 50 initializes internal data structures within the proxy server 50 and also opens and initializes sockets for communicating with the customer LAN 18 and the switch LAN 16. The startup component 100 can also initiate a session supervisor included in the session controller 104, as described below.

The login routine 102 receives and authenticates client requests to connect to the proxy server 50. To connect to the proxy server 50, a client submits a sign-up envelope. The sign-up envelope is a data packet transferred from the client to the proxy server 50, and contains the following information: class of service ID, service request, and client name and password or authentication information. If the sign-up envelope is not received within a predetermined time after establishing the open request, the login routine 102 will close the connection. To identify the client and the requested service, the login routine checks the sign-up envelope for consistency and matches it against its local database. Based on the class of service ID, the login routine authenticates the client by means of password or authentication method.

The authentication method can be a conventional authentication process based on public-key encryption schemes, such as RSA. In such a case, the login routine 102 would include a local database storing public keys corresponding to authorized users. The authentication information in the envelope would include a digital signature encrypted by the particular client using a private key. The login routine 102 would decrypt the digital signature using the stored public key and verify the signature against a list of signatures of authorized users. Using a password scheme, the database would include a list of client names and passwords. The client name and password in the envelope would be compared to the database list. If a match is found, the connection would be authorized; otherwise, it would be disconnected.

The session control component 104 includes a session setup component and a session supervisor. The session setup uses the class of service ID to fetch a service class provided by the server for the particular service ID. Each service class has attributes of priority, maximum number of concurrent sessions allowed, maximum time period for a connection to remain open, and file name for recording requests and responses for debugging purposes. Based on the attributes of the service class, the session setup checks the request and negotiates with the load control component 110 to see if the connection is permitted at the particular time. If the client request passes these checks, the session setup prepares the session environment and starts a session thread to service the transport layer. If the session setup check fails, the client is notified of the reason and the connection closed.

The session supervisor is a continuously active software thread that monitors the status of each of the connected session threads. If a connected session has reached its maximum login duration time, the session supervisor terminates the session, and notifies and disconnects the client.

Each active session thread handles one transport layer connection and passes requests and responses between a network application on the client and a switch application running on the server 14 or the switch 12.

Communicating with the session controller 104, the load control component 110 monitors system performance and prevents overloading due to client application requests. Since a single client request can initiate activities with high calculation and search demands in either the SWU 72 or the ADP 70 of the switch 12, a load control mechanism is used rather than a message flow control scheme. The load control component 110 maintains two sets of thresholds: (1) system thresholds and, (2) service thresholds. The operation of the load control mechanism 110 is based upon these threshold values.

The system thresholds contain information about limitations of the switch 12 components, i.e., the SWU 72 and ADP 70, as well as the communications server 14 itself. The information can include the maximum number of active sessions, maximum log file size, maximum computational load allowed in the SWU 72, and maximum computational load allowed in the ADP 70. Computational loads typically reflect the amount of time a processor is dedicating to a particular task. Conventional operating systems such as UNIX and Windows™ NT include library functions for determining computational loads at given times.

The service thresholds can be specific to each class of service. The thresholds can include maximum session duration allowed for the service, maximum concurrent connections, maximum percentage computational load to be caused by the requested service in the SWU 72, maximum percentage of computational loads to be caused by the service in the ADP 70, and service priority.

The load control mechanism 110 acts to prevent overloading the ADP 70, the SWU 72, and communications server 14. It does this based on the anticipated load that the requesting application will cause if executed. A new connection is allowed if the ADP 70, SWU 72 and communications server 14 thresholds are not exceeded. If they are exceeded, the load control component 110 notifies the session setup routine in the session controller 104, which rejects the requested connection and so notifies the requesting client.

The administrator component 108 maintains the proxy server database and can also perform functions such as displaying the on-line status of the server 14, displaying error logs, auditing and statistical information. The administrator 108 can also include a routine to deactivate the proxy server 50. The administrator component 108 can be accessed via a JAVA applet executing on a remote client. The administrator applet can include password protection. The proxy server database management of the administrator 108 includes the following functions: the ability the lock and unlock the database during transactions, database configuration, and export and import of database information. The database can include information on authorized users, such as client names, passwords and the like. In addition, the database can include the above-described threshold values used by the load control component 110.

The error report component 116 generates a central error log file which contains information about transmission errors between the clients and communication server. Each error record has a distinct header, which contains information about the particular server or client application that generated it. The maximum size allowed for the error log file is configurable by the administrator component 108.

The alarm component alerts network administrators to run-time problems such as resource over allocation or data inconsistency. The alarm component 112 can generate an e-mail message that can be transferred over the customer LAN to a predetermined e-mail address of a network administrator. In addition, the alarm component 112 can generate messages that are immediately displayable on an administrator's monitor (not shown), connected directly to the communications server 14. The alarm component 112 can also include a software routine for generating an alarm message by dialing out through a modem to an administrator's workstation.

The audit component 114 includes software for auditing and generating statistics on operational parameters such as time of connection, connection duration, time of termination, termination status, the IP address of each client, and the like.

The shutdown component 106 is included to permit the proxy server 50 to be stopped for various reasons such as maintenance. Upon detecting a shutdown request from the administrator component 108, the shutdown component 106 can generate a message that will be sent to all clients having open sessions. The shutdown routine can also cause the proxy server to wait for a predetermined time limit to expire before disconnecting all sessions and releasing all resources.

Figure 4:
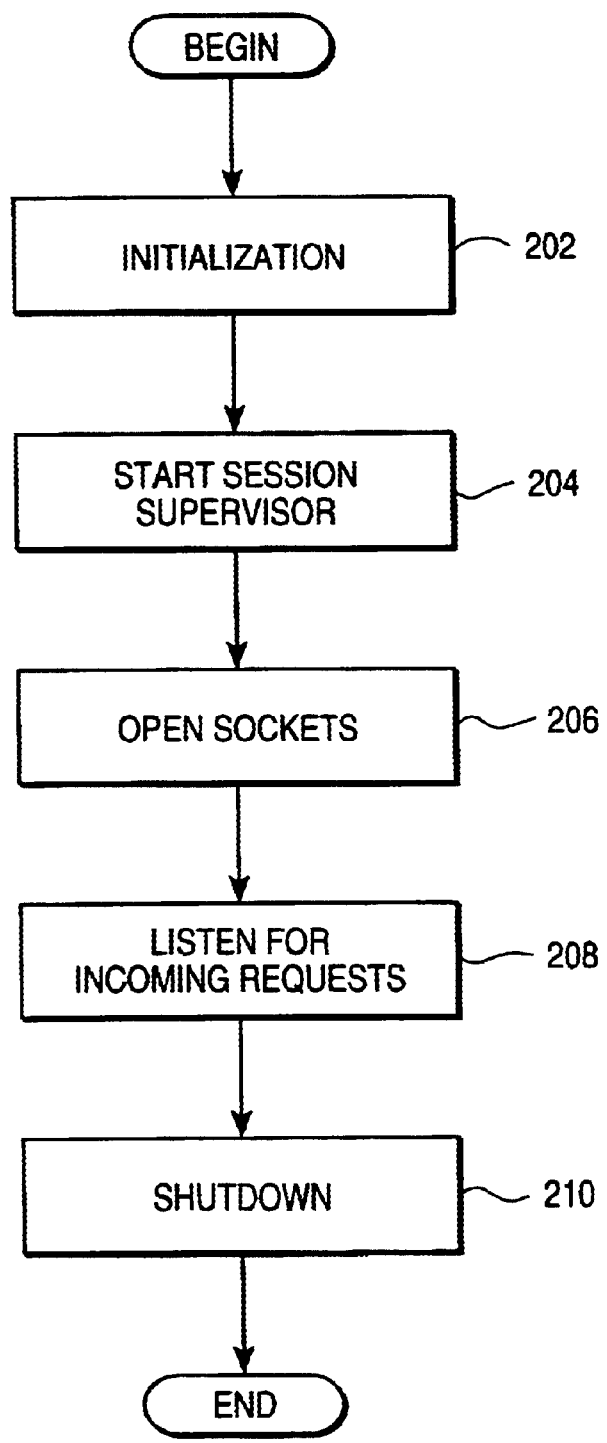
FIG. 4 is a flowchart diagram illustrating the operation of the proxy server shown in FIG. 2.

FIG. 4 is a flowchart diagram illustrating an operational procedure 200 of the proxy server 50. In step 202, the proxy server initializes its internal data structures using the startup component 100. Next, in step 204, the proxy server 50 starts the session supervisor included in the session control component 104. In step 206, the proxy server 50 opens sockets so that communication over the customer and switch LANs 16–18 can take place. A socket is essentially a software object that connects an application to a network protocol. In UNIX, for example, an application can send and receive TCP/IP messages by opening a socket and reading and writing data to and from the socket.

Figure 5:
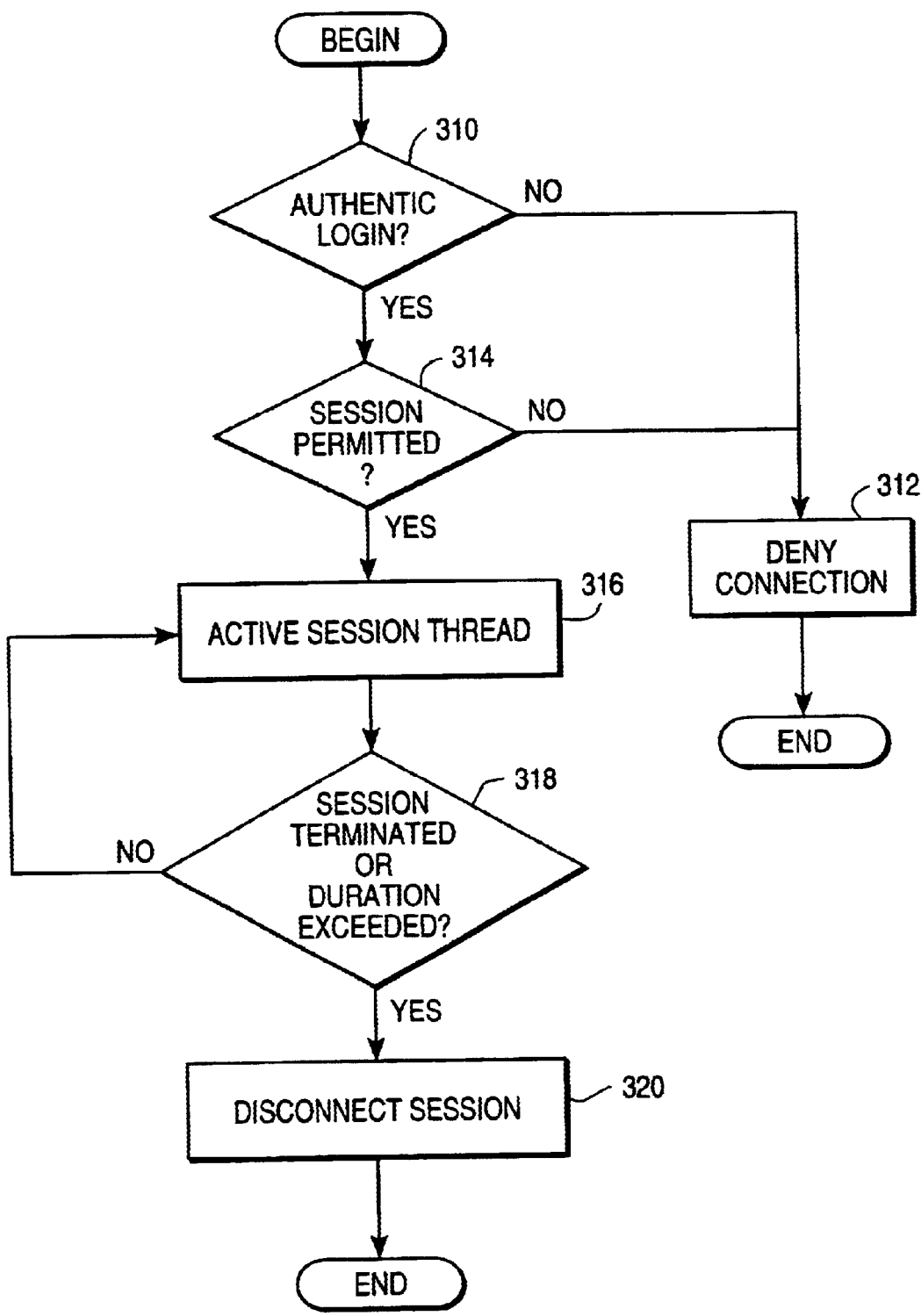
FIG. 5 is a flowchart diagram illustrating a method of responding to session requests received by the proxy server shown in FIG. 2.

In step 208, the proxy server 50 enters a continuous loop routine to listen for incoming requests from the clients and the switch. Details on how the proxy server 50 responds to an incoming request are illustrated in FIG. 5. In the final step 210, the proxy server 50 can be shut down by a request by the administrator component 108 or a power-down condition.

FIG. 5 illustrates a method 300 for responding to client requests that is executable by the proxy server 50. Upon receiving a connection request from a client, the proxy server authenticates the login (step 310). If the login is not authorized, the proxy server 50 denies the connection (step 312). However, if the proxy server verifies that the login is authorized, it proceeds with an attempt to set up a session (step 314). As discussed earlier, the proxy server 50 ascertains the current number of connections and computational load and then determines whether the requested session will exceed the limitations of either the switch 12 or the server 14. If the requested session exceeds these limitations, then the connection is denied (step 312). If the limitations are not exceeded, the session is established by the proxy server 50 and a session thread is activated (step 316). The session supervisor continuously monitors the status of the active session thread to determine whether the session has terminated or the predetermined session duration limit has been exceeded (step 318). If a termination condition does arise, the session supervisor causes the client to disconnect and terminates the session (step 320).

What is claimed is:

1. A system for communicating with a telecom switch, comprising:
   a proxy server for managing connectivity between at least one software application residing on the telecom switch and at least one network application;
   wherein said proxy server comprises a gateway permitting client-server communication between said telecom switch and devices running at least one network application, said gateway providing single-point entry to said at least one software application while allowing concurrent connectivity for each of a plurality of application sessions.

2. The system of claim 1, wherein the proxy server is capable of maintaining concurrent connectivity for a plurality application sessions.

3. The system of claim 1, further comprising:
   an HTTP server in communication with the proxy server.

4. The system of claim 1, further comprising:
   a watch-dog timer for detecting a hang-up condition.

5. The system of claim 1, further comprising:
   a LAN interface permitting the proxy server to communicate with the telecom switch using a TCP/IP protocol.

6. The system of claim 1, further comprising:
   a remote client including the at least one network application; and
   a network permitting communication between the remote client and the proxy server.

7. The system of claim 6, wherein the network includes the Internet.

8. The system of claim 6, wherein the remote client is included in a personal computer.

9. The system of claim 1, wherein the proxy server includes a load control mechanism.

10. The system of claim 1, wherein the proxy server includes a client authentication routine.

11. A computer-readable memory storing a program for directing a computer to function as a proxy server for managing connectivity between at least one software application residing on a telecom switch and at least one network application residing on a remote client;

wherein said proxy server comprises a gateway permitting client-server communication between said telecom switch and said remote client, said gateway providing single-point entry to said at least one software application while allowing concurrent connectivity for each of a plurality of application sessions.

12. The computer-readable memory of claim 11, wherein the proxy server permits a plurality of concurrent connections between the telecom switch and one or more remote clients.

13. The computer-readable memory of claim 11, wherein the proxy server includes a routine for authenticating the remote client prior to establishing a connection.

14. The computer-readable memory of claim 11, wherein the proxy server includes a routine for limiting the duration of a connection to the telecom switch.

15. The computer-readable memory of claim 11, wherein the proxy server generates an error log file.

16. A method of communicating with a telecom switch, comprising:

providing a proxy server for managing connectivity between the telecom switch and a remote client, said proxy server comprising a gateway permitting client-server communication between said telecom switch and said remote client, said gateway providing single-point entry to at least one software application while allowing concurrent connectivity for each of a plurality of application sessions;

connecting to the proxy server from the remote client; and communicating with the telecom switch by establishing an application session between the telecom switch and the remote client.

17. The method of claim 16, further comprising:

logging into the proxy server.

18. The method of claim 16, further comprising:

providing at least one applet at the remote client for communicating with the telecom switch.

19. The method of claim 16, for remotely configuring the telecom switch, further comprising:

invoking at the remote client an applet for updating configuration data stored at the telecom switch.

20. The method of claim 16, further comprising:

using a web browser to connect to the proxy server.

* * * * *